United States Patent
Bridges et al.

(10) Patent No.: US 7,263,577 B2
(45) Date of Patent: Aug. 28, 2007

(54) POWER SAVING METHODS AND APPARATUS TO SELECTIVELY ENABLE COMPARATORS IN A CAM RENAMING REGISTER FILE BASED ON KNOWN PROCESSOR STATE

(75) Inventors: Jeffrey Todd Bridges, Raleigh, NC (US); James Norris Dieffenderfer, Apex, NC (US); Michael Scott McIlvaine, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 11/072,849

(22) Filed: Mar. 3, 2005

(65) Prior Publication Data
US 2006/0206688 A1    Sep. 14, 2006

(51) Int. Cl.
*G06F 12/00* (2006.01)
(52) U.S. Cl. .................................................... 711/108
(58) Field of Classification Search ................ 711/108; 365/227, 229
See application file for complete search history.

(56) References Cited
U.S. PATENT DOCUMENTS 6,317,819 B1    11/2001    Morton
6,571,332 B1 *  5/2003    Miranda et al. ............. 712/245
2003/0088811 A1 * 5/2003  Cherabuddi et al. .......... 714/42
2004/0024968 A1 * 2/2004  Lesartre et al. ............. 711/128
2004/0215988 A1  10/2004  Clabes et al.
2006/0062036 A1 * 3/2006  Ng et al. ..................... 365/49

* cited by examiner

Primary Examiner—Hyung Sough
Assistant Examiner—Kenneth M Lo
(74) Attorney, Agent, or Firm—Nicholas J. Pauley; John L. Ciccozzi (57) ABSTRACT

A renaming register file complex for saving power is described. A mapping unit transforms an instruction register number (IRN) to a logical register number (LRN). The renaming register file maps an LRN to a physical register number (PRN), there being a greater number of physical registers than addressable by direct use of the IRN. The renaming register file uses a content addressable memory (CAM) to provide the mapping function. The renaming register file CAM further uses current processor state information to selectively enable tag comparators to minimize power in accessing registers. When a tag comparator is not enabled it remains in a low power state. A processor using a renaming register file with low power features is also described.

20 Claims, 6 Drawing Sheets

POWER SAVING METHODS AND APPARATUS TO SELECTIVELY ENABLE COMPARATORS IN A CAM RENAMING REGISTER FILE BASED ON KNOWN PROCESSOR STATE

BACKGROUND OF THE INVENTION

1. Field of the Invention

The present invention relates generally to techniques to reduce power in a processor, and, more particularly, to advantageous techniques for selectively enabling comparators in a content addressable memory (CAM) renaming register file based on known processor state.

2. Relevant Background

In order to achieve high performance program execution, a processor implementation may use a pipeline that operates at a high clock rate with short duration pipeline stages. The instruction set architecture for this type of processor may also specify a set of general purpose registers to be used by execution units as sources of data and destinations for results. Each instruction includes, as a portion of the instruction encoding, bit fields that specify the addresses of registers to be used as source or destination operands. These register specifiers are referred to as instruction register numbers (IRNs). The set of general purpose registers available for use by the execution units may vary, dependent upon the processor's operating state. For example, a program executing in a particular operating mode may be restricted to using instructions that can access only a subset of the total set of general purpose registers. The processor may also support executing instructions out of order during pipelined execution and prior to completing the instructions in program order. In order to support deep pipelines with out of order execution, a processor may implement a larger number of physical registers than can be supported by the processor's instruction set architecture. The physical registers implemented in a register file would typically be accessed by use of a physical register number (PRN) address. There are difficulties, though, with an instruction directly using a PRN address. For example, a processor supporting an instruction set architecture with an IRN address space of sixteen registers may be implemented with a PRN address space of sixty four physical registers. To resolve this difference between the IRN address space and the PRN address space, the processor may use renaming hardware to map an IRN address contained in an instruction to a physical register number (PRN) address. Such mapping can be accomplished by use of a content addressable memory (CAM) having tags, tag comparators, and data arrays. The renaming hardware may use the IRN address as a tag for a physical register stored in the CAM data array.

The problem with using CAMs for such purposes is that the CAM tag comparators in a generic CAM implementation are evaluated on every register file access. For a high performance implementation, the CAM comparators are dynamic designs and consume power as they precharge and discharge. Further, since the register file is typically a multi-ported structure, there are multiple CAM comparators on each port further increasing power drain.

SUMMARY OF THE DISCLOSURE

Among its several aspects, the present invention recognizes that a need exists for a technique which provides a low power content addressable memory (CAM) controlled register file. In one aspect, the control technique uses a tag that is stored in the CAM, with the tag being an address of an element of the CAM, and the tag having an attribute within the tag describing an operating state of a processor. A tag comparator compares the tag with an address generated by the processor. An operating state comparator compares the attribute with a current operating state of the processor in order to determine whether to enable or disable the tag comparator.

Another aspect addresses, a method for selecting register address comparators to be disabled in a content addressable memory (CAM) based register file. In this method, register address comparators which cannot possibly match on a given access are identified based on knowledge of a state of a processor which is utilized in conjunction with the CAM based register file. The identified register address comparators are controlled so that they enter a low power state. Other aspects of the invention are addressed as described in further detail below.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Computer program code or "program code" for being operated upon or for carrying out operations according to the teachings of the invention may be initially written in a programming high level language such as C, C++, JAVA®, Smalltalk, JavaScript®, Visual Basic®, TSQL, Perl, or in various other programming languages. A program written in one of these languages is compiled to a target processor architecture. Programs for the target processor architecture may also be written directly in the native assembler language. A native assembler program uses instruction mnemonic representations of machine level binary instructions. Program code or computer readable medium as used herein refers to machine language code such as object code whose format is understandable by a processor.

Figure 1:
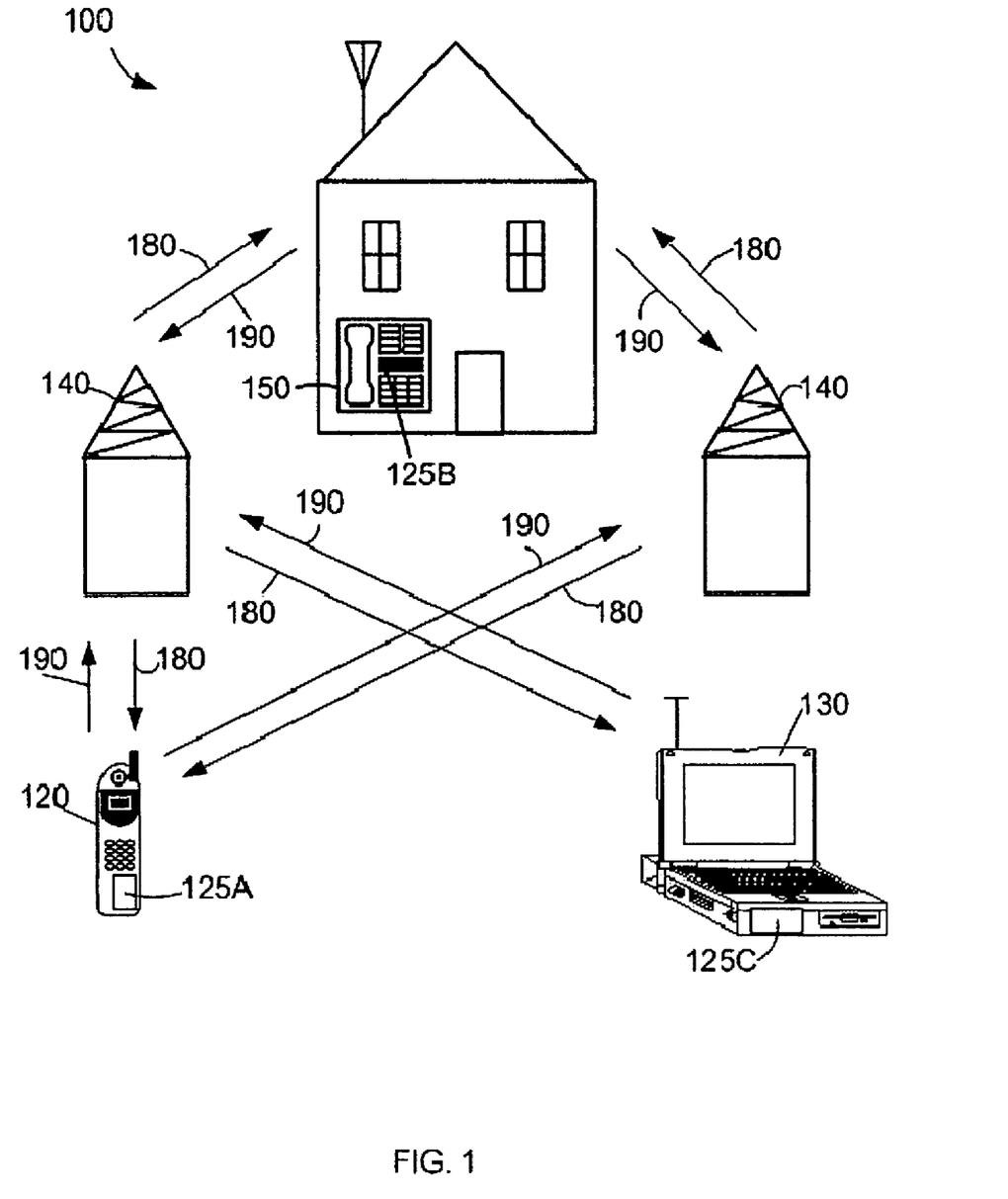
FIG. 1 is an illustration of an exemplary wireless communication system in which an embodiment of the invention may be advantageously employed.

FIG. 1 shows an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems may have many more remote units and base stations. Remote units 120, 130, and 150 include hardware components 125A, 125B, and 125C, respectively, which execute program code in accordance with the present invention. FIG. 1 shows a forward link signal 180 from the base stations 140 and the remote units 120, 130, and 150 and a reverse link signal 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any hardware component using a pipelined processor having a CAM-based renaming register file and an instruction set architecture that restricts operand register address space dependent upon a processor's mode of operation.

Figure 2:
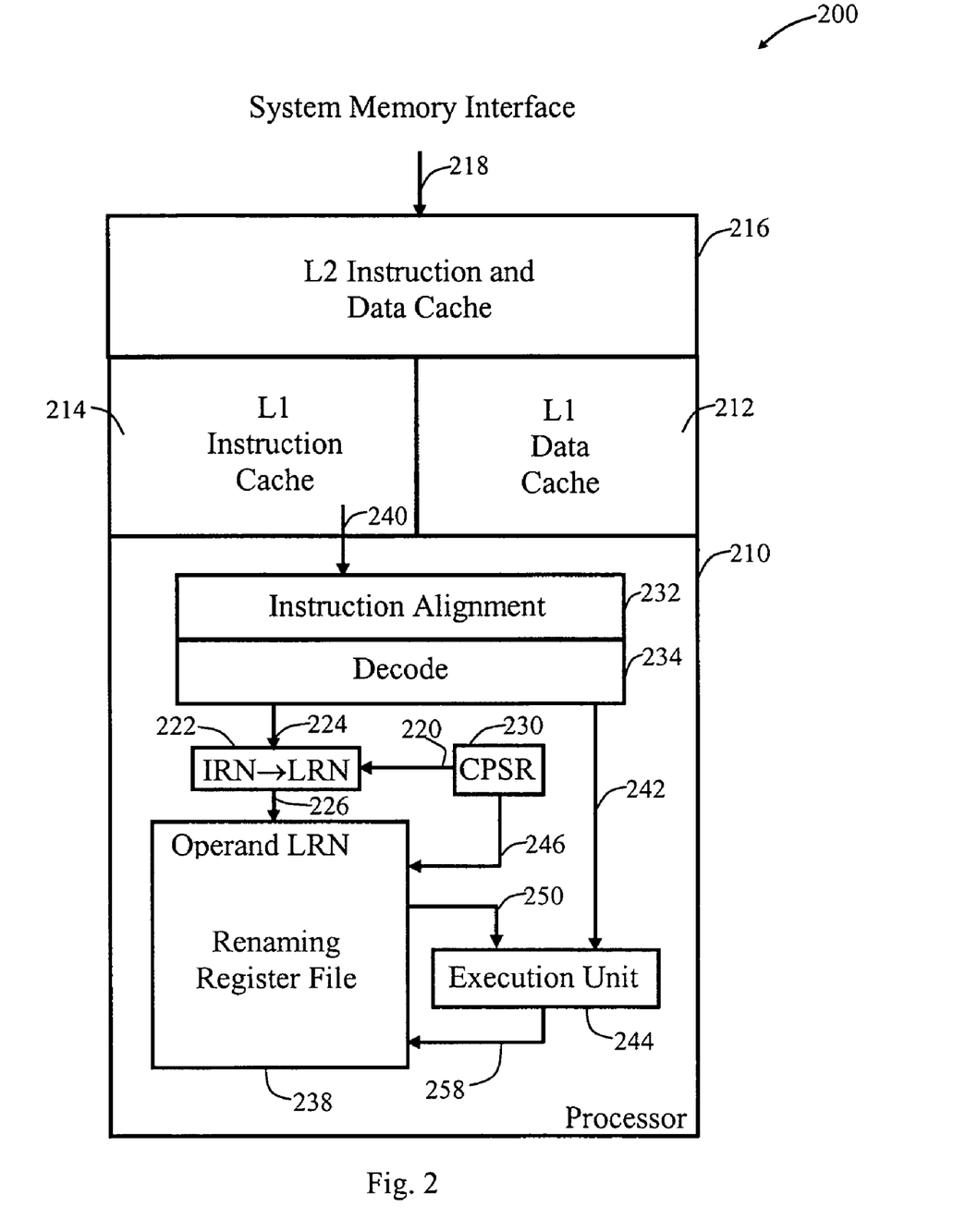
FIG. 2 is a block diagram of a processor complex in accordance with the present invention.

FIG. 2 shows a block diagram of a processor complex 200 in which an embodiment of the invention may be employed. The process complex 200 may be suitably employed in hardware components 125A-C for executing program code. The processor complex 200 includes a pipelined processor 210, a level 1 (L1) data cache 212, an L1 instruction cache (Icache) 214, a level 2 instruction and data cache (L2 cache) 216, and a system memory interface 218. Peripheral devices, which may connect to the processor complex, are not shown for clarity of discussion of the present invention. The processor 210 is directly coupled to the L1 data cache 212 and L1 Icache 214 from which the processor 210 retrieves data and instructions, respectively, from the hierarchical memory organization.

A processor's instruction set architecture may have 32-bit instruction formats with 4-bit register operand address fields, referred to herein as instruction register number (IRN) fields, that identify up to sixteen registers for each 4-bit IRN. The instruction set architecture may further define modes of operation in which an instruction's 4-bit IRN refers to different registers. For example, IRNs 8-14 may refer to different registers dependent upon the operating mode of the processor. As a result of such variation in interpretation of the IRNs in an instruction, a larger number of registers is required in the processor than a 4-bit IRN would seem to indicate. For example, thirty two registers in a register file may be necessary to support all the registers that could be addressed by the instructions' 4-bit IRN fields in the various modes of operation of the processor. The same processor may also support instruction formats that use 3-bit IRNs, for example, in 16-bit instruction formats. Since 3-bit and 4-bit IRNs are insufficient to specify all of the available thirty two registers afforded by the example processor 210, an encoding of the processor's mode of operation 220 is used in a mapping function 222 to transform an IRN to a 5-bit logical register number (LRN). The 5-bit LRN allows addressing the architecture's defined set of registers in the register file. In general, the mapping function 222 is not a simple concatenation of an operating mode bit with an IRN, since subsets of the IRN space may map to different registers. For example, the processor's architecture may specify IRN R14 to map to multiple different registers, dependent upon the operating mode.

In typical use, the processor 210 can be expected to primarily execute a user's application code in a general user mode. Less frequently, processor 210 executes code in different operating modes, such as a supervisor mode or other modes, for example, to handle interrupts or exceptions. Providing efficient support for the frequently used user mode is advantageous for reduced power operation. For efficiency reasons, the user mode of the processor 210 specifies a restricted usage of register space to registers having an IRN which maps to an LRN in the range of 0-15. The other operating modes, in other words, the non user modes, make use of registers within an LRN range of 0-31. Thus the processor 210 when in user mode does not have access to registers within an LRN range of 16-31. The general mapping of the IRN to the LRN requires knowledge of the operating mode of the processor, which may be defined by a bit field encoding 220 of a current processor status register (CPSR) 230. For example, a 4-bit IRN provided on operand address signals 224 is appropriately transformed by use of the CPSR 230 to a 5-bit LRN as a read port address output 226. It will be recognized that while the present invention is described in a particular context that it will be applicable to other modes of operations and different register allocations than those specifically described.

In a pipelined processor, such as processor 210, a greater number of physical registers are implemented than is supported by the instruction set architecture. One consequence of having a large number of physical registers in processor 210 is that multiple values of the same instruction specified register can be held simultaneously in unique physical registers. With this approach, a number of data dependencies between instructions can be resolved, breaking up sequential execution barriers without stalling the pipeline and thereby improving performance.

The processor 210 is made up of an instruction alignment unit 232, a decode unit 234, a renaming register file 238, a current processor state register (CPSR) 230, and multiple execution units, of which, only a single execution unit 244 is shown for clarity of illustration. Instructions are received in the instruction alignment unit 232 from the memory hierarchy over interface 240. After the instructions are properly aligned they are decoded in the decode unit 234. The decode operation utilizes control signals 242 to provide control information to the execution unit 244. Operand address signals 224 are utilized to provide source and target operand IRN addresses to the mapping unit 222. The mapping unit 222 maps each operand IRN address to a LRN based on the current processor state. For example, for 32-bit instructions, a 4-bit A3-A0 operand source IRN address is converted to a 5-bit A4-A0 LRN. Similarly, for 16-bit instructions, 3-bit IRNs are converted to 5-bit LRNs as determined by the current processor state, as defined by the processor's instruction set architecture. The renaming register file 238 also receives a current processor state bit or bits from CPSR output 246 of the CPSR 230.

The renaming register file 238 maps the LRN to a physical register number (PRN). The PRN is used to access the appropriate register value and the value stored in the PRN register is output on read output port 250. Also, when an instruction is issued, a result register is tagged in the renaming register file 238. At the end of an instruction's execution, which may be after a number of execution pipeline stages, a result, generated by the execution unit 244, is sent on output bus 258 to the renaming register file 238 where it is stored at the previously tagged result PRN address.

Figure 3A:
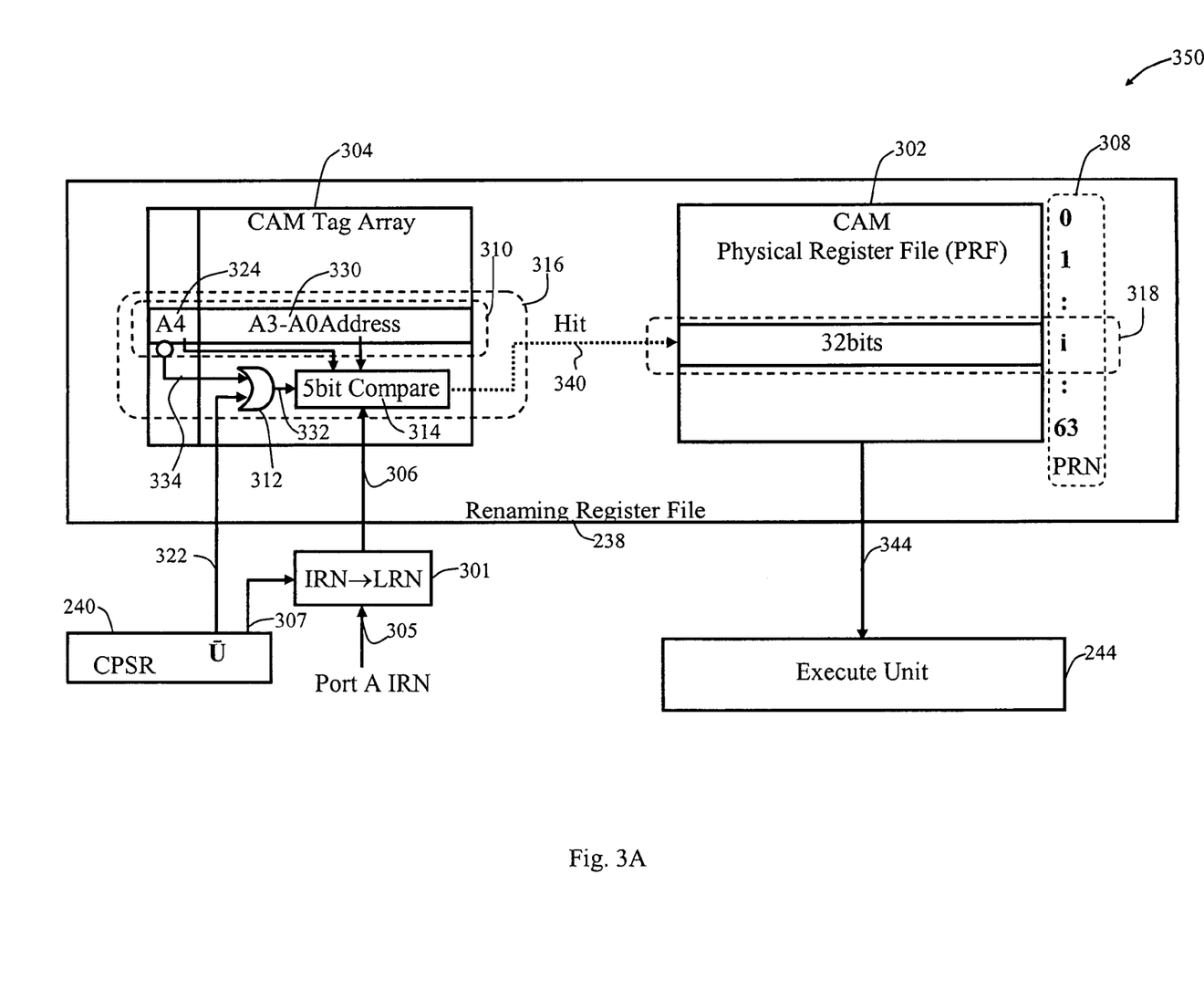
FIG. 3A is an illustration of an exemplary apparatus for mapping an instruction register number (RN) to a physical register number (PRN) in a renaming register file complex having a renaming register file, a mapping unit, a current processor status register (CPSR), and an execution unit in accordance with the present invention.

FIG. 3A illustrates an exemplary embodiment for mapping an instruction register number (IRN) to a physical register number (PRN) in a renaming register file complex 300 having renaming register file 238, a mapping unit 301, the CPSR 240, and the execution unit 244. The renaming register file 238 contains a CAM physical register file (PRF) 302, and a CAM tag array 304 for a single read port of the register file. The mapping unit 301 maps an IRN provided on port A IRN input 305 to an LRN on LRN output 306 based on CPSR state 307. The CAM PRF 302 holds a greater number of registers than specified by the processor's architecture, for example, sixty four registers, each addressable by a PRN 308. The CAM tag array holds sixty four tags, such as tag 310, and compare logic associated with each tag, such as OR gate 312 and compare logic 314. A tag and tag compare logic together are referenced as a tag function 316. Each tag, such as tag 310 stores a 5-bit LRN, A4-A0, in the CAM tag array 304. The tag is associated with a register, such as register i 318, in the CAM PRF 302. In a typical CAM, the compare logic for all tags is operative to compare an incoming address with all of the tags to determine if there is a match between the incoming address and the stored tag. In the advantageous CAM tag array 304 of the present invention, the compare logic is selectively enabled for comparing based on the processor's operating state. If a tag compare logic is not enabled it is in a low power state.

After decode, such as that performed by decode stage 234 of FIG. 2, the generated LRN output 306 is input to the CAM tag array 304. The CPSR 240 outputs a not user mode ($\overline{U}$) signal 322 which is also input to the CAM tag array 304. The not user mode ($\overline{U}$) signal 322 and the 5-bit operand LRN output 306 are input to each tag function, such as tag function 316. In each tag function, the $\overline{U}$ signal 322 is OR'd with the inverse of the most significant bit of the 5-bit LRN stored in the tag. For example, in tag function 316, the $\overline{U}$ signal 322 and not A4 ($\overline{A4}$) 324 are input to OR gate 312. The A3-A0 bits are stored in a 4-bit address section 330 of the tag 310. The purpose of the OR gates, such as OR gate 312, is to generate a signal to enable the compare logic in each tag function. For the processor 210 of the present example, all the compare logic in each tag function is operative if the processor is not in user mode.

In tag function 316, the not user mode $\overline{U}$ signal 322 is a 1 and the output of OR gate 312 is a 1 enabling the comparator 314 when the processor is not in user mode. If the processor is in user mode, the $\overline{U}$ signal 322 will be a 0. If the most significant bit of the tag address A4 is a 0, the not A4 signal 334 will be a 1, and then the OR gate 312 will output an enable signal 332 that is a 1 to enable the compare logic 314 for LRNs 0-15 which have A4 equal to 0. Alternatively, if the processor is in user mode, the $\overline{U}$ signal 322 will be a 0 and if the most significant bit of the LRN tag address A4 is a 1, for LRNs 16-31, the not A4 signal 334 will be a 0, and then the OR gate 312 will output the enable signal 332 as a 0 keeping the compare logic 314 in a low power state. The enable signal 332 logic function is given by the following equation: $\overline{A4} \vee \overline{U}$=enable signal 332 where the symbol $\vee$ represents a logical OR operation. The $\overline{A4} \vee \overline{U}$=enable signal 332 function is equivalent to a NAND implementation using equation: $\neg(A4 \wedge U)$=enable signal 332 where the symbol $\neg$ represents a logical NOT operation inverting the value in the parenthesis and the symbol $\wedge$ represents a logical AND operation.

Depending upon the compare logic implementation, a disable signal may be used as an alternative to the above described enable signal 332. A disable signal can be obtained by replacing the OR gate 312 with an AND gate and providing the A4 signal as one input and a user mode U signal as the second input, as given by the following equation: $A4 \wedge U$=disable signal. In this case, the disable signal will only be active if the processor is in user mode and the tag LRN is between 16-31.

When a tag compare logic is enabled and there is a match between the 5-bit operand LRN address 306 and the stored LRN tag A4 324 A3-A0 330, a hit is said to have occurred. The hit situation, logically indicated by hit signal 340, causes the PRN register 318 associated with the matched tag to be accessed from the CAM PRF 302 and output on read port 344 as an input to the execution unit 244.

Figure 3B:
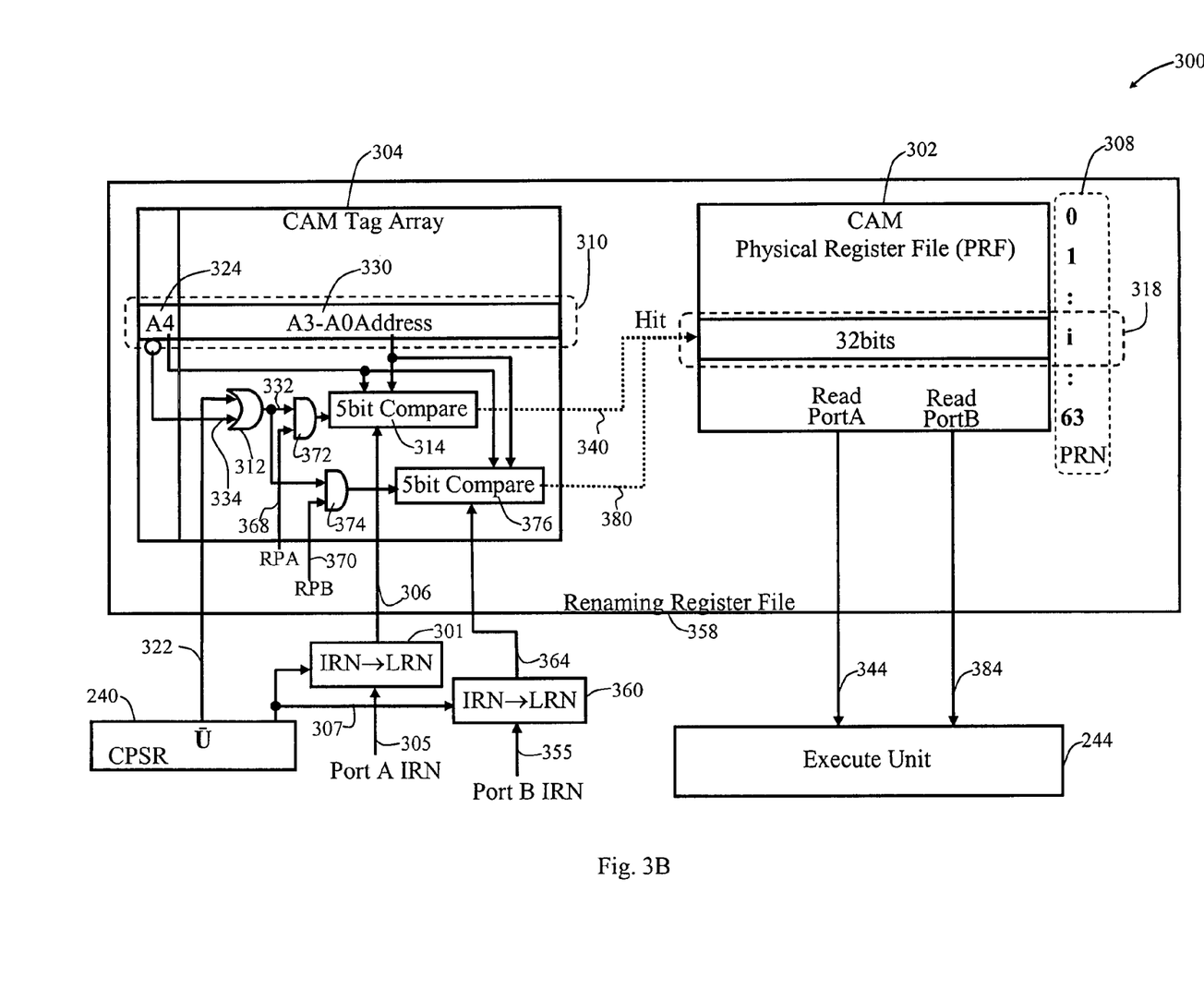
FIG. 3B is a graphical illustration of an exemplary apparatus for mapping an IRN to a PRN in a renaming register file complex with multiple port addresses having a renaming register file, multiple mapping units, a CPSR, and an execution unit in accordance with the present invention.

FIG. 3B illustrates mapping an IRN to a PRN in a renaming register file complex 350 with multiple port addresses 305 and 355 having a renaming register file 358, multiple mapping units 301 and 360, a CPSR 240, and an execution unit 244. Even though only two operand read ports to the renaming register file 358 are shown in FIG. 3B, it is appreciated that the renaming register file complex 350 can be extended to support additional operand read ports, such as six simultaneous read ports in a processor, for example.

For each read port, a separate mapping unit is provided such as mapping unit 301 to map port A IRN 305 to an LRN on output 306 and mapping unit 360 to map port B IRN 355 to an LRN on output 364. Read port A (RPA) 368 and read port B (RPB) 370 are enable signals used in the tag function enable logic AND gates 372 and 374 to disable comparators 314 and 376, respectively, if the read ports are not being used.

The tag 310 supplies the address bits A4 324 and A3-A0 330 to both comparators 314 and 376. If the enable signals RPA 368 and RPB 370 are active indicating the read ports are to be used, both comparators are enabled dependent upon the most significant bit A4 and the CPSR operating mode U, using $\overline{A4} \vee \overline{U}$=enable signal 332 providing the same power saving features to both comparators as previously described with the register file renaming complex 300 of FIG. 3A. With multiple comparators for each tag, multiple hits, such as hit signals 340 and 380, may occur in numerous arithmetic operations, such as occurs, when multiplying R7*R7 to obtain $R7^2$. With multiple hits, the same register, such as register i 318, is output to multiple ports, such as read port A 344 and read port B 384.

Figure 4:
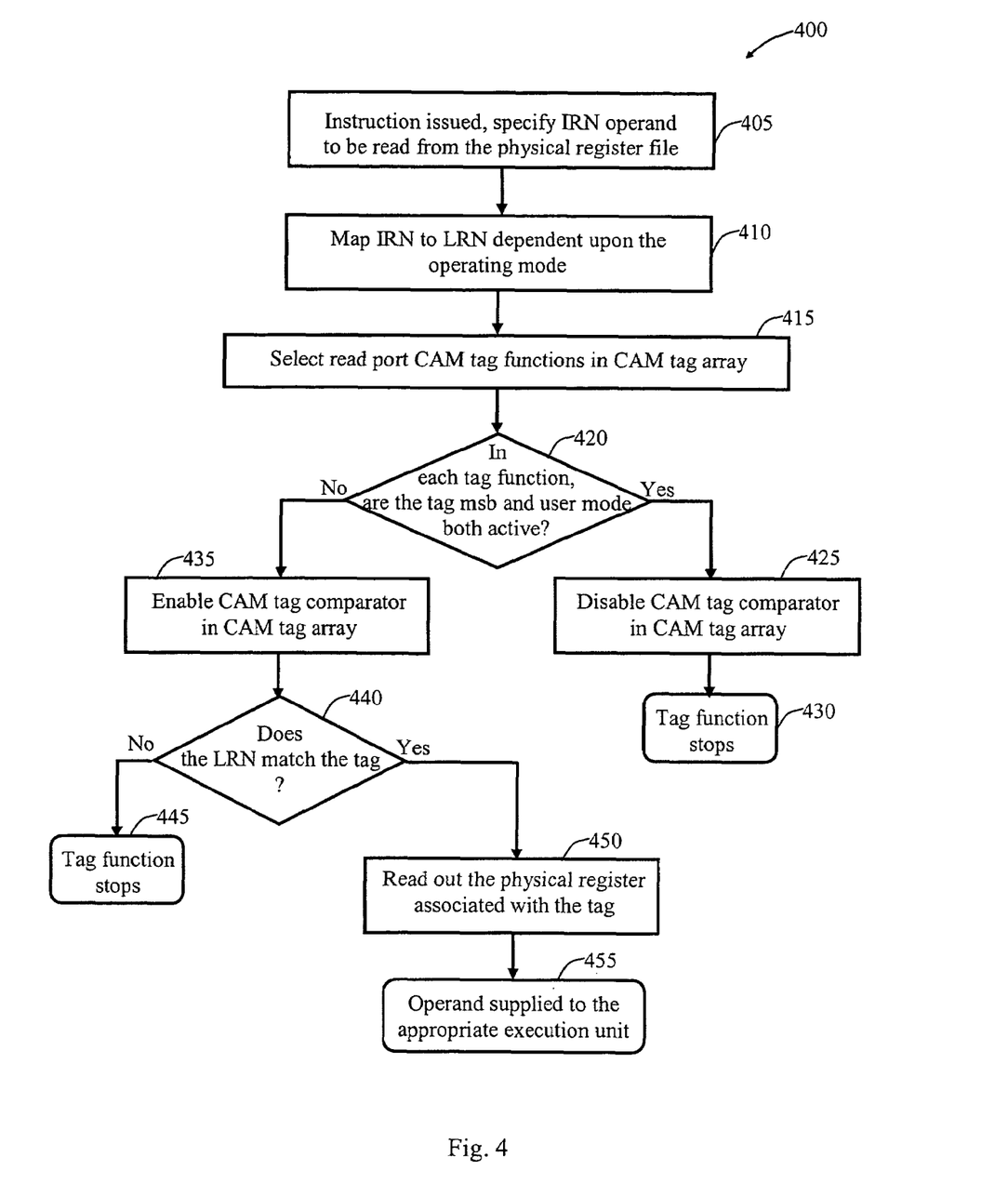
FIG. 4 is a graphical illustration of a process for selectively enabling content addressable memory (CAM) tag comparators in the renaming register file in accordance with the present invention.

FIG. 4 illustrates a process 400 for selectively enabling content addressable memory (CAM) tag comparators in the renaming register file in accordance with the present invention. The first step 405 occurs when an instruction is issued and the instruction specifies a source operand IRN to be read from a renaming register file, such as renaming register file 358. In the next step 410, the IRN is mapped to an LRN in a mapping unit, such as mapping unit 301, dependent upon the operating mode of the processor, as provided by a current processor state register (CPSR), such as CPSR 240. In step 415, the appropriate read port CAM tag functions, such as tag function 316, are selected by use of read port enable signals in the CAM tag array, such as CAM tag array 304. In step 420, which occurs in parallel across all the selected read port tag functions, the tag's most significant bit (msb) and the user mode (U) from the CPSR are both tested to be active, both being a 1. If both the tag msb and user mode are active in a tag function, then the tag function disables the CAM tag comparator in step 425. In step 430, the tag function stops for each disabled CAM tag comparator and the disabled comparator remains in a low power state.

If in step 420 both the tag msb and the user mode are not active in a tag function, then the tag function enables the CAM tag comparator in step 435. In step 440, which occurs in parallel across all enabled CAM tag comparators, the LRN is compared to the tag, such as tag 310, by a comparator, such as comparator 314. If the LRN does not match with the tag, the tag function stops in step 445. If the LRN does match with the tag, a hit occurs, such as indicated by hit signal 340, and the physical register associated with the tag is read out of a physical register file (PRF), such as the CAM PRF 302, in step 450. The read out register value is supplied via a read port, such as read port 344, to an appropriate execution unit, in step 455, such as execution unit 244.

Figure 5:
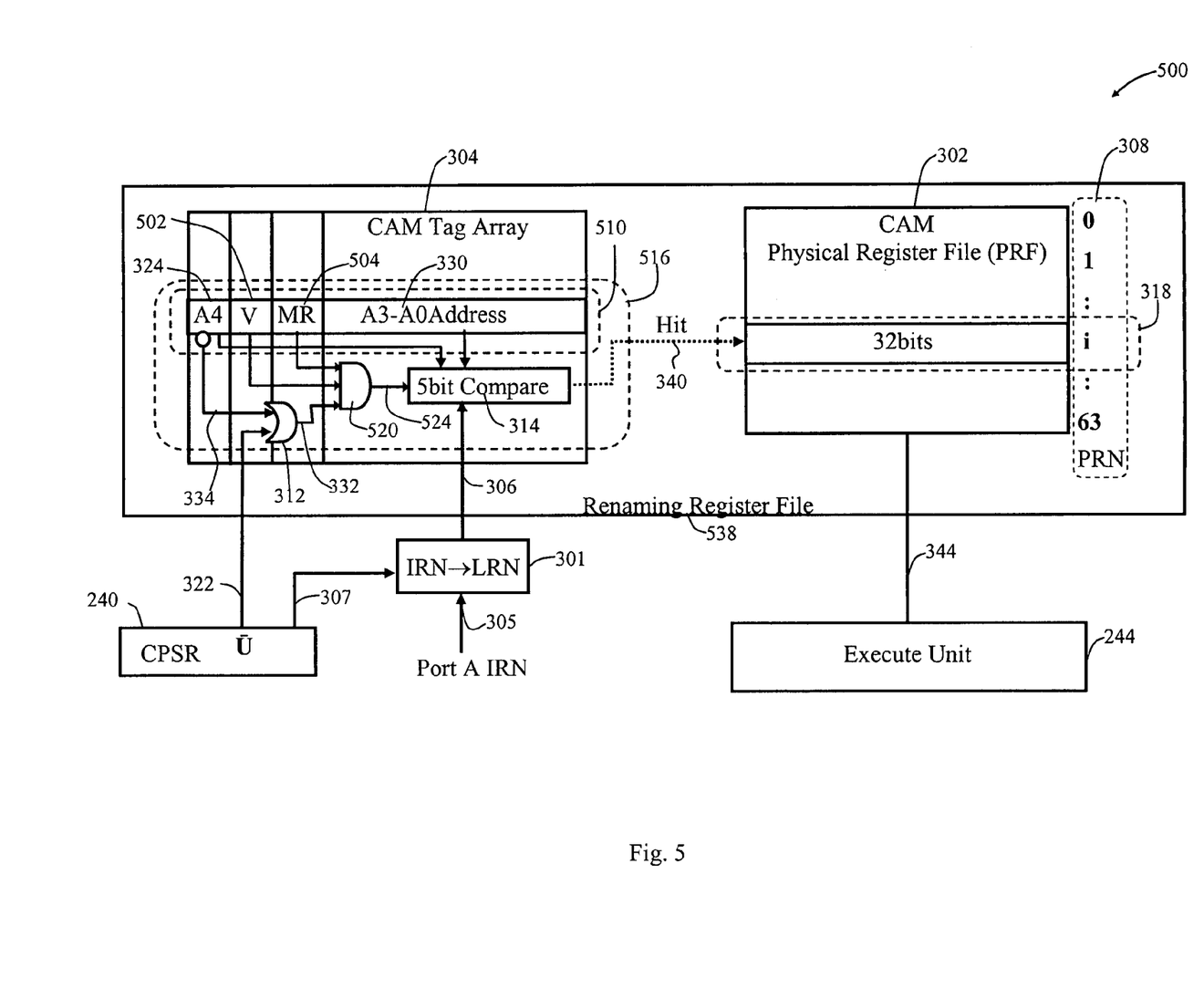
FIG. 5 is a graphical illustration of another exemplary apparatus for mapping an instruction register number (IRN) to a physical register number (PRN) in a renaming register file complex having a renaming register file with a valid bit and a most recently used bit in the tags, the mapping unit, the CPSR, and the execution unit in accordance with the present invention.

FIG. 5 illustrates another aspect of mapping an instruction register number (IRN) to a physical register number (PRN) in a renaming register file complex 500 having a renaming register file 538 with a valid bit 502 and a most recently used (MR) bit 504 in the tags, such as tag 510, mapping unit 301, CPSR 240, and execution unit 244. A tag and tag compare logic together are referenced as a tag function 516. The valid bit 502 indicates the PRN register associated with the tag is not valid when the valid bit is a 0. When the valid bit is a 0, the compare logic is not enabled and remains in a low power state. The MR bit 504 indicates whether the PRN register associated with the tag holds a most recently generated value or not. When an instruction issues specifying a result LRN, a physical register entry is allocated to receive the data value and the tag is written with the LRN. The tag is marked as most recent by setting the MR bit for that entry when the result data is written several cycles later, further in the pipeline. Also, the MR bit 504 for the entry that previously contained the most recent data value for that particular LRN address is reset. If the MR bit 504 is a 0 for a particular entry, the compare logic for that entry is not enabled and kept in a low power state.

The renaming register file complex 500 is similar to the renaming register file complex 300 of FIG. 3 with the addition of the valid bit 502, the MR bit 504 and new logic for enabling the compare logic. The new logic employs a three input AND gate 520 between the OR gate 312 and the compare logic 314. One input to the AND gate 520 is the MR bit 504, a second input is the valid bit 502, and the third input is the OR gate output 332. Whenever at least one of the three inputs to AND gate 520 is 0, the compare logic is kept in a low power state. In order to enable the compare logic, the data value 318 must be valid, V=1, the most recent data, MR=1, and the OR gate 312 output must be a 1 allowing the AND gate output 524 to be a 1 and enable the compare logic 314.

Since, on average, the user mode is the most highly used mode in operation, and user mode restricts the register address space to 0-15, forty eight of the sixty four compare logic functions in the CAM tag array 304 for each read port are typically not enabled and kept in a low power state. This represents a significant savings in CAM tag array power as compared to a design in which all sixty four compare logic functions are utilized each access regardless of the processor's mode of operation.

An alternative approach to using the OR gate 312 is to implement a mode selected (MS) latch in each tag function, such as tag function 316, 516. The MS latch can be set or reset at each mode change performed by the processor, which is a relatively infrequent event, and so changing the state of the MS latch could take a cycle or two, requiring a small mode change latency to be observed. Upon entry into a new processor mode, each tag entry would evaluate the new mode and set or reset the MS latch appropriately. Then the MS latch output could be used to keep the compare logic in a low power state if the entry cannot match because the entry is only accessible from modes other than the current processor mode.

While the present invention has been disclosed in a presently preferred context, it will be recognized that the present teachings may be adapted to a variety of contexts consistent with this disclosure and the claims that follow.

For example, in an alternative architecture which partitions register file usage to exclusive sets of registers dependent upon the operating mode, multiple renaming register files may be used. An out of order execution deeply pipelined processor may be defined with two distinct operating modes. For example, two operating modes such as a user mode and a supervisor mode to handle system, interrupts, and exceptions may be employed. In the processor implementation, one renaming register file may be used for user mode and one renaming register file may be used for supervisor mode. For this alternative architecture, the user mode supports 16 registers as specified by the instruction set. The user mode renaming register file would require additional registers, for example 16 additional registers, to support in-flight instructions due to out of order execution and the deep pipeline. In supervisor mode, the supervisor mode renaming register file would support a separate set of 16 architected registers and have 16 in-flight registers due to out of order execution and the deep pipeline. A total of 32 user mode physical registers would be used in the user mode renaming register file. A total of 32 supervisor mode physical registers would be used in the supervisor mode renaming register file. In operation, only one renaming register file will be active dependent upon the operating mode and the other renaming register file would be in a low power state. Other such modifications and adaptations to suit a particular design application will be apparent to those of ordinary skill in the art.

We claim:

1. A content addressable memory (CAM) control apparatus comprising:
    a tag that is stored in the CAM, the tag being an address of an element of the CAM and an attribute within the tag describing an operating state of a processor;
    a tag comparator that compares the tag with an address generated by the processor; and
    an operating state comparator that compares the attribute with a current operating state of the processor, wherein the tag comparator is enabled or disabled depending upon the results of the comparison of the attribute with the current operating state of the processor.

2. The CAM control apparatus of claim 1 wherein the tag comparator is disabled if the attribute matches the current operating state of the processor.

3. The CAM control apparatus of claim 1 wherein the tag comparator is in a low power state when disabled.

4. The CAM control apparatus of claim 1 wherein the tag comparator is enabled if the attribute does not match the current operating state of the processor.

5. The CAM control apparatus of claim 1 wherein the tag comparator when enabled generates a hit indication when the tag matches the address generated by the processor.

6. The CAM control apparatus of claim 5 further comprising:
a CAM physical register file holding a plurality of physical registers operating so that upon a hit indication a physical register associated with the matched tag is selected.

7. The CAM control apparatus of claim 1 wherein the attribute is the most significant bit of the tag.

8. The CAM control apparatus of claim 1 wherein the current operating state of the processor is indicated by a bit stored in a current processor state register.

9. The CAM control apparatus of claim 1 wherein the address generated by the processor is a logical register number (LRN).

10. The CAM control apparatus of claim 9 wherein the LRN is obtained by mapping an instruction register number (IRN) to the LRN dependent upon the current operating state of the processor.

11. The CAM control apparatus of claim 1 further comprising:
a plurality of tags that are stored in the CAM and each tag having an attribute which describes an operating state of the processor;
a tag comparator associated with each tag; and
an operating state comparator associated with each tag, wherein the operating state comparator compares the attribute in each tag with the current operating state of the processor wherein the tag comparator associated with each tag is enabled or disabled depending upon the results of the comparison of the attribute in the tag with the current operating state of the processor.

12. The CAM control apparatus of claim 1 further comprising:
a plurality of access ports;
a plurality of tags that are stored in the CAM and each tag having an attribute which describes an operating state of the processor;
a tag comparator associated with each tag for each access port; and
an operating state comparator associated with each tag, wherein the operating state comparator compares the attribute in each tag with the current operating state of the processor wherein a plurality of tag comparators associated with each tag for each access port are enabled or disabled depending upon the result of the comparison of the attribute in the tag with the current operating state of the processor.

13. An apparatus for saving power when reading a register from a register file, the apparatus comprising:
a processor for reading operands in support of instruction execution;
a physical register file (PRF) having operands to be read by the processor;
an array of tags, a tag having an address associated with an operand in the PRF, the tag having an attribute describing the operating state of the processor;
an array of tag comparators, each tag comparator operating to compare an operand address generated by the processor with a tag, a tag comparison match being required to read an operand from the PRF; and an array of operating state comparators, wherein each operating state comparator associated with a tag, and operating to compare the attribute with a current operating state of the processor and enabling or disabling the associated tag comparator, wherein less than all of the tag comparators are enabled for comparing based on the comparison of the attribute with the current operating state of the processor.

14. The apparatus of claim 13 wherein the attribute is the most significant bit of the tag.

15. The apparatus of claim 13 wherein the tags further comprise a most recent bit, the most recent bit in a tag indicating a status of the associated operand in the PRF and a tag comparator further enabled or disabled dependent upon the most recent bit in the tag being compared.

16. The apparatus of claim 13 further comprising:
a plurality of access ports;
an array of tag comparators for each access port; and
an array of operating state comparators, wherein each operating state comparator associated with a tag, and operating to compare the attribute with a current operating state of the processor and enabling or disabling the associated tag comparator for each access port, wherein less than all of the tag comparators for each access port are enabled for comparing based on the comparison of the attribute with the current operating state of the processor.

17. A method for selecting register address comparators to be disabled in a content addressable memory (CAM) based register file, the method comprising:
identifying which register address comparators cannot possibly match on a given access based on the knowledge of a state of a processor to be utilized in conjunction with the CAM based register file; and
controlling the register address comparators identified as cannot possibly match so that they enter a low power state.

18. The method of claim 17 further comprises:
comparing an attribute of a tag of the CAM with a current operating state of a processor; and
identifying the register address comparators that cannot possibly match on a given access as those register address comparators whose attribute of a tag matches with the current operating state of the processor.

19. The method of claim 17 wherein the step of controlling the register address comparators identified as cannot possibly match further comprises:
comparing an attribute of a tag of the CAM with a current operating state of a processor; and
controlling the register address comparators to be disabled dependent upon the comparison of the attribute of a tag of the CAM with the current operating state of the processor.

20. The method of claim 17 further comprises:
generating in a processor a logical register number; and
supplying the logical register number to the register address comparators to be compared with a tag of the CAM.

* * * * *